United States Patent [19]

Takahashi et al.

[11] Patent Number: 5,396,353
[45] Date of Patent: Mar. 7, 1995

[54] OPTO-ELECTRICAL APPARATUS EMPLOYING LATERAL MIM DEVICE PAIRS

[75] Inventors: Kotoyoshi Takahashi; Takeyoshi Ushiki, both of Suwa, Japan

[73] Assignee: Seiko Epson Corporation, Tokyo, Japan

[21] Appl. No.: 904,104

[22] Filed: Jun. 24, 1992

[30] Foreign Application Priority Data

Mar. 27, 1992 [JP] Japan ................... 4-102054

[51] Int. Cl.⁶ .............................................. G02F 1/136
[52] U.S. Cl. ...................................... 359/58; 359/79; 359/60
[58] Field of Search ................. 359/57, 58, 59, 54, 359/74, 79; 345/90, 91, 93

[56] References Cited

U.S. PATENT DOCUMENTS

| 4,683,183 | 7/1987 | Ono .................... | 359/58 |
| 4,929,059 | 5/1990 | Takahashi et al. ......... | 359/87 |
| 5,069,534 | 12/1991 | Hirai .................... | 359/54 |
| 5,101,288 | 5/1992 | Ohta et al. .............. | 359/58 |
| 5,299,040 | 3/1994 | Mizobata ................. | 359/58 |

FOREIGN PATENT DOCUMENTS

| 40410023 | 4/1992 | Japan .................... | 359/58 |
| 40416533 | 6/1992 | Japan .................... | 359/58 |
| 2-091468 | 7/1982 | United Kingdom . | |
| 2-244858 | 12/1991 | United Kingdom . | |

*Primary Examiner*—William L. Sikes
*Assistant Examiner*—Tai V. Duong
*Attorney, Agent, or Firm*—W. Douglas Carothers, Jr.; Dave G. Alexander

[57] ABSTRACT

An opto-electrical apparatus, such as, a liquid crystal display device, comprises a pixel electrode driving element a first conductor, an insulator and a second conductor formed in stacked sequence on the substrate with the insulator comprising a thicker barrier layer atop the first conductor compared to the side portions thereof. The second conductor is formed in two locations on the insulating side portions of the insulator as well as a portion of the top surface comprising the barrier layer. As a result, a pair of nonlinear devices are formed relative to the same insulator and are connected between a pixel electrode and inter-device interconnect so that an electrically aligned, series connected pair of MIM devices with opposite polarity formation both having nonlinear current/voltage characteristics. Concurrently, a pair of parasitic, secondary MIM devices are also formed in electrically aligned fashion between a pixel electrode and is inter-device interconnect, but the signal path developed through these secondary MIM, devices is characterized by including two thick barrier layers and has the same effect of doubling the barrier layer thickness and creating about twice the resistance and reducing by about one half the capacitance. As a result, deteriorating electrical characteristics due to presence of the secondary nonlinear device, are prevented so that there is a major improvement in the image quality and the reproducibility and yield of the opto-electrical apparatus.

5 Claims, 5 Drawing Sheets

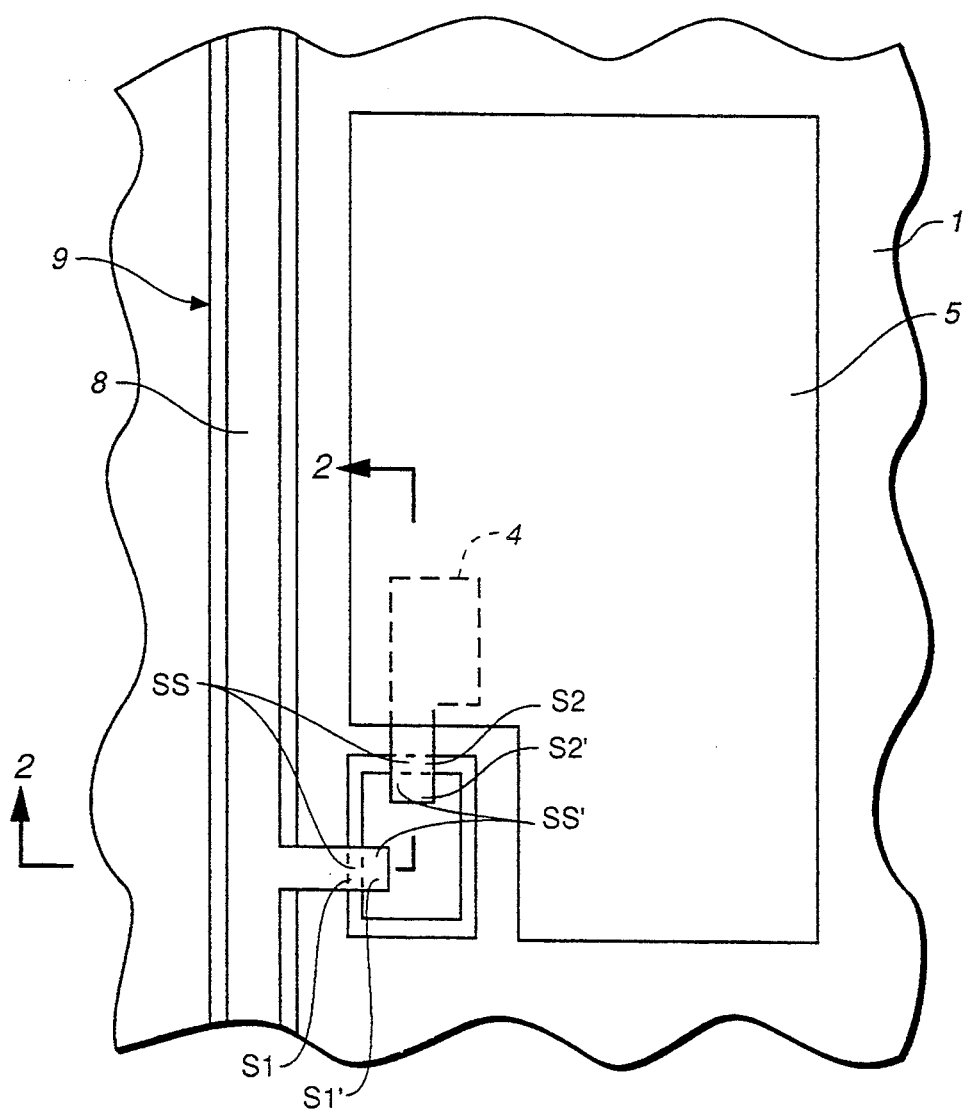
FIG._1
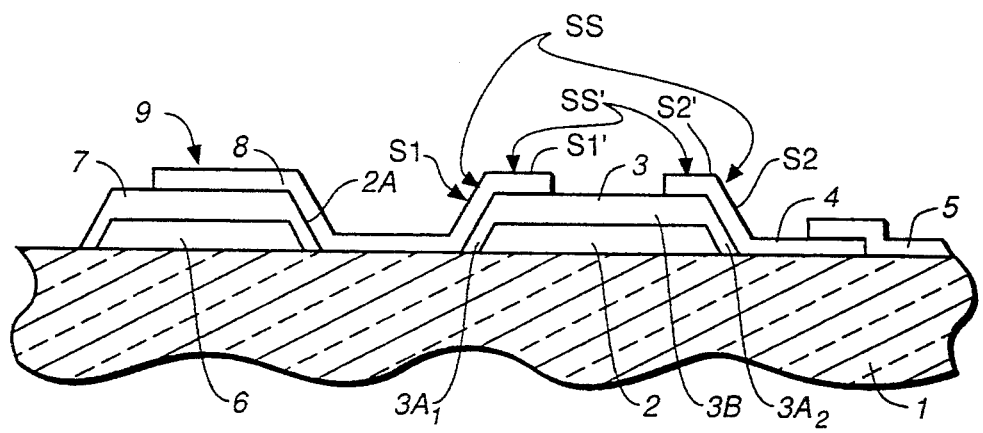
FIG._2

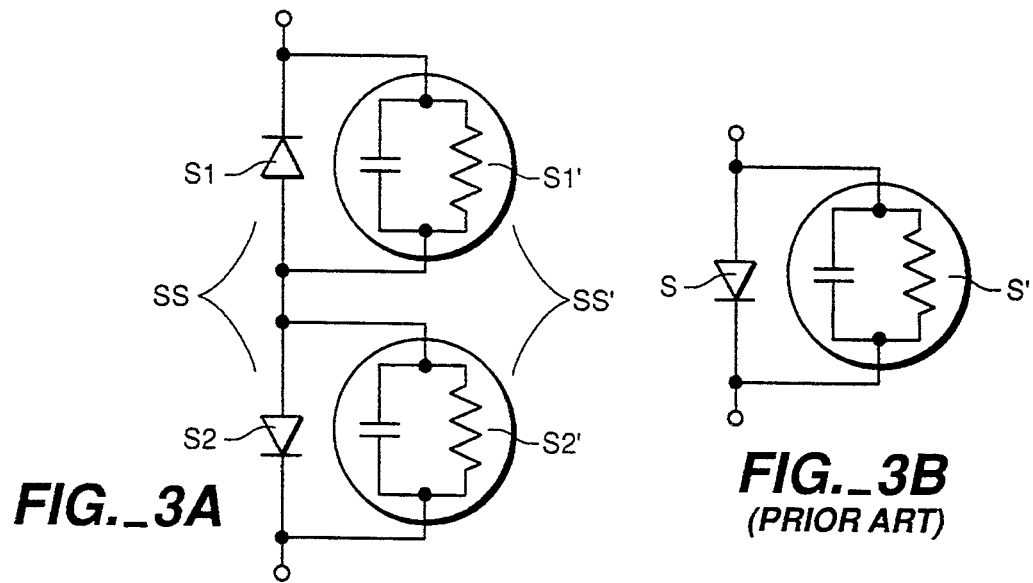
FIG._3A
FIG._3B
(PRIOR ART)
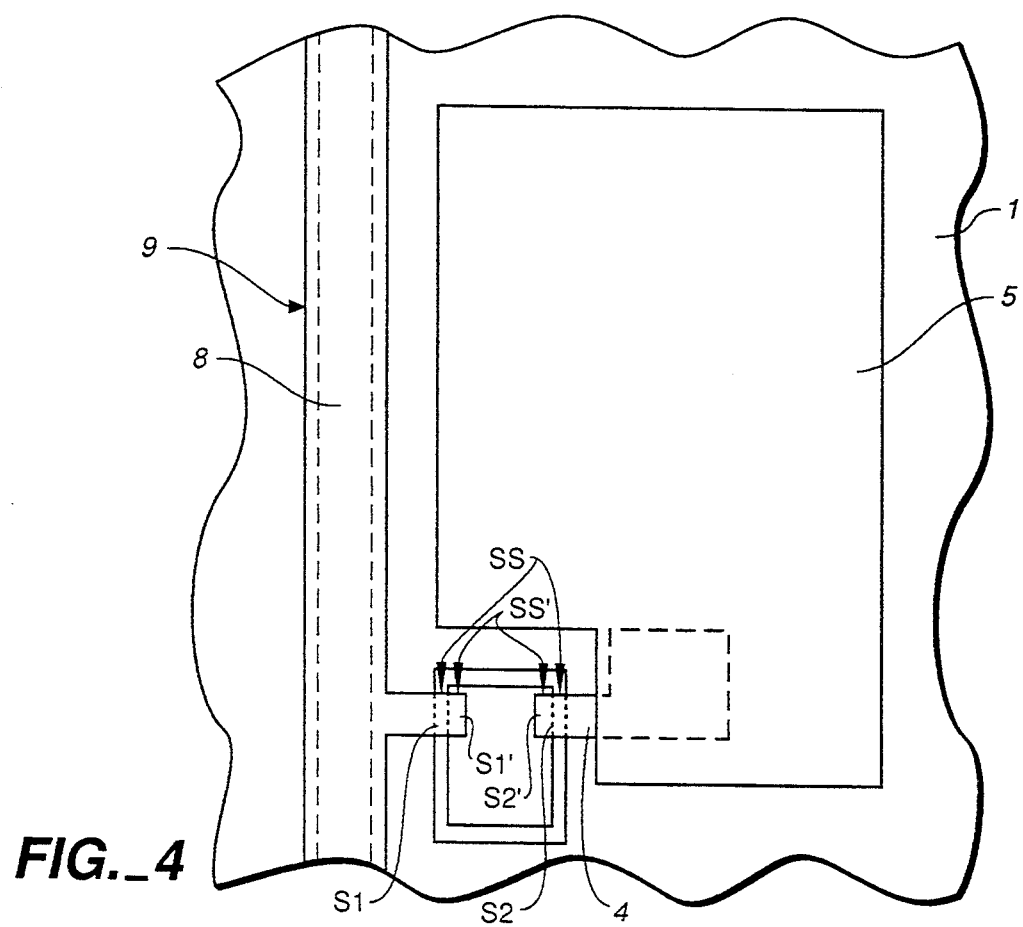
FIG._4

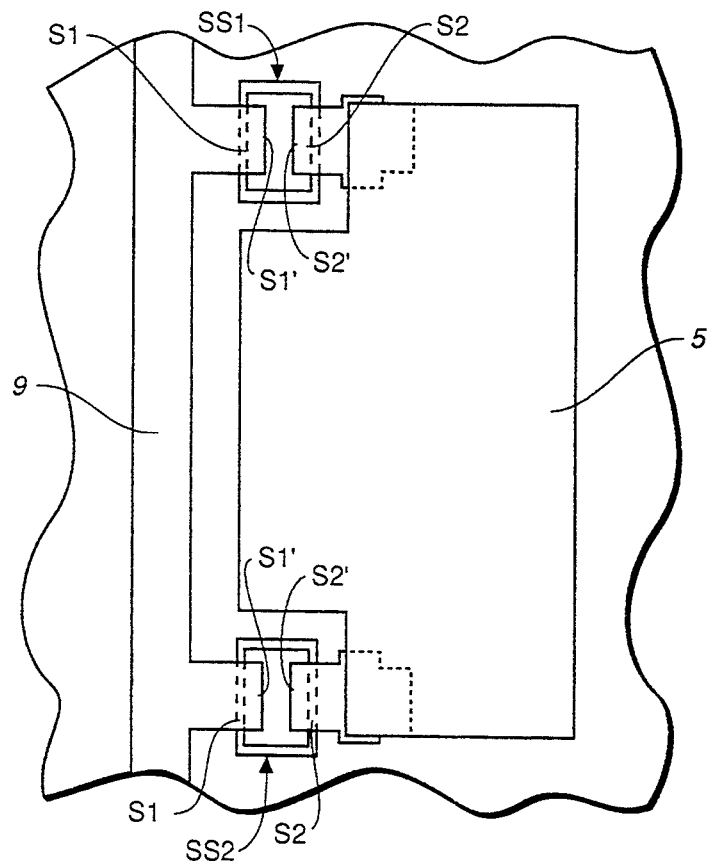
FIG._5
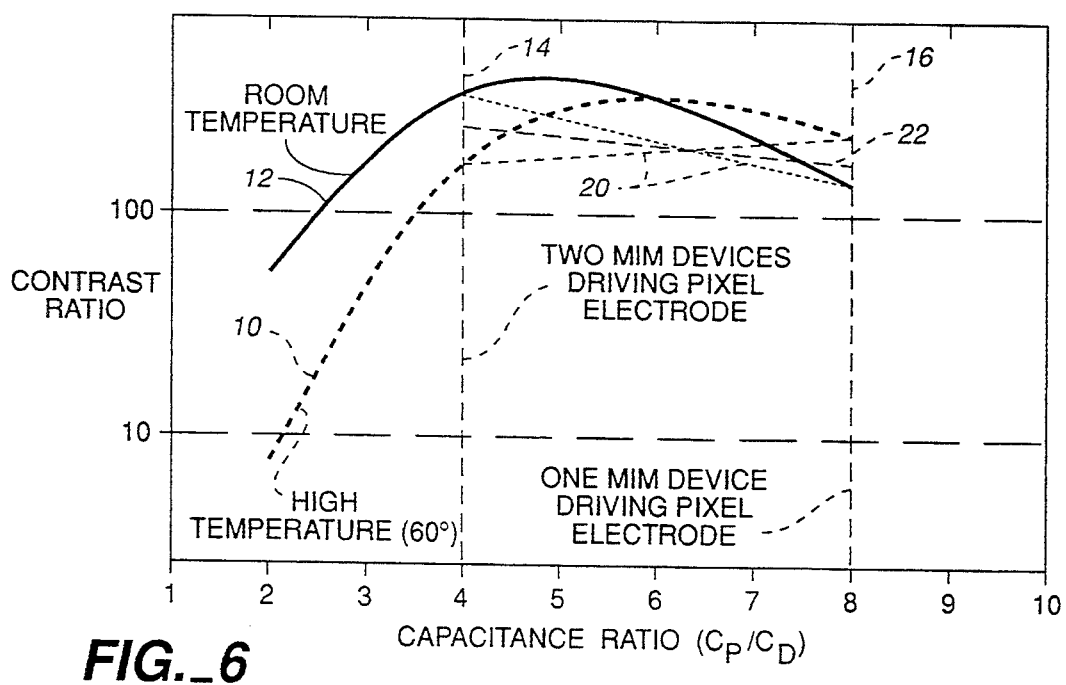
FIG._6

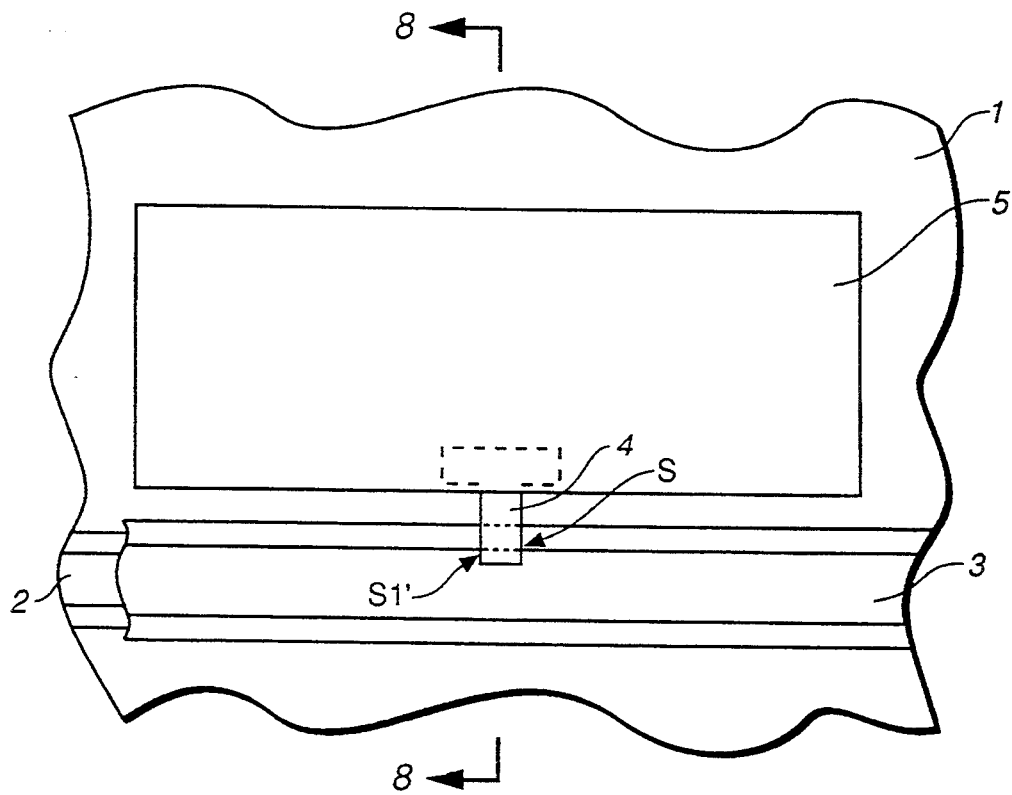
FIG._7
(PRIOR ART)
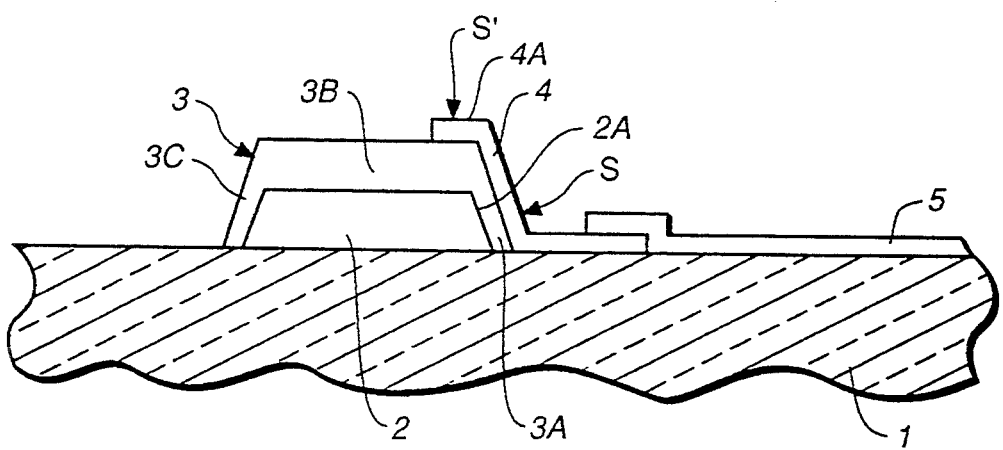
FIG._8
(PRIOR ART)

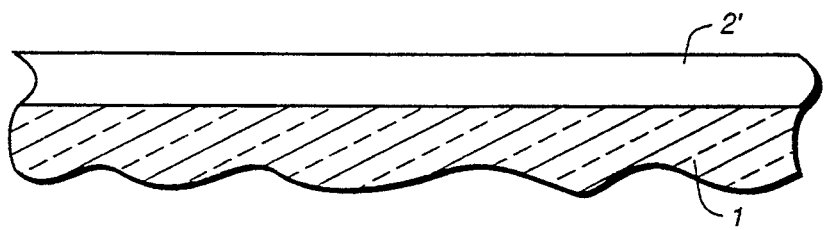
FIG._9A
*(PRIOR ART)*
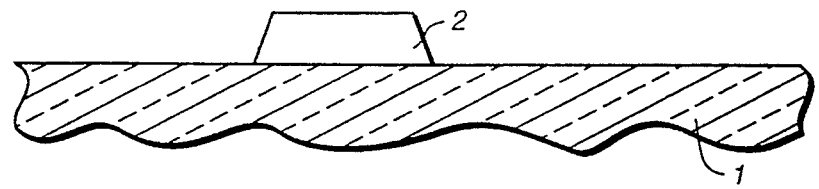
FIG._9B
*(PRIOR ART)*
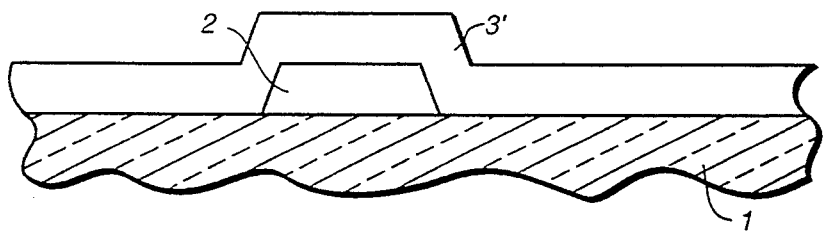
FIG._9C
*(PRIOR ART)*
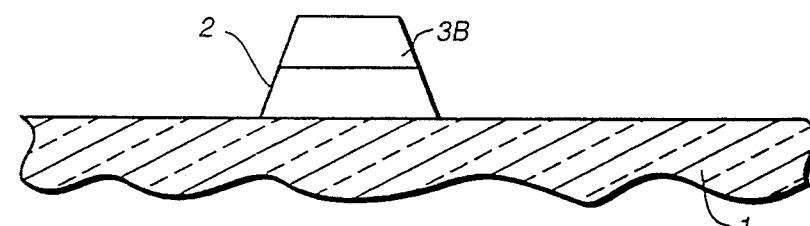
FIG._9D
*(PRIOR ART)*
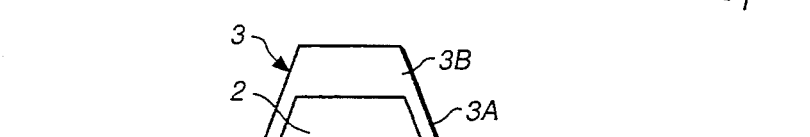
FIG._9E
*(PRIOR ART)*
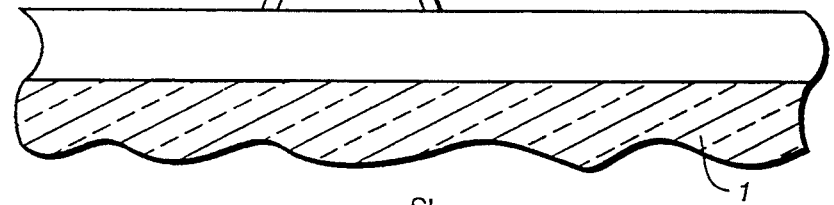
FIG._9F
*(PRIOR ART)*

OPTO-ELECTRICAL APPARATUS EMPLOYING LATERAL MIM DEVICE PAIRS

BACKGROUND OF THE INVENTION

This invention relates generally to an opto-electrical apparatus, such as, a liquid crystal display device and, more particularly, relates to opto-electrical apparatus utilizing nonlinear devices, such as, MIM devices, to drive pixel electrodes such as in a liquid crystal display panel.

In conventional liquid crystal display panels employed in opto-electrical apparatus, a plurality of pixel electrodes are arranged in a matrix on an appropriate substrate and with a companion substrate retain therebetween a liquid crystal layer. Each pixel electrode is driven through nonlinear devices exhibiting nonlinear current/voltage characteristics. FIG. 7 shows a portion of a substrate, commonly referred to as the lower substrate, including a conventional nonlinear device, S, of the MIM type. FIG. 8 is a cross sectional view taken along the line 8—8 of FIG. 7. In reference to FIGS. 7 and 8, substrate 1 is generally made of transparent glass. A conductor 2 is formed on substrate 1, such as, for example, comprising tantalum (Ta). Next, an insulator 3 comprising tantalum oxide ($TaO_x$) is formed on conductor 2, i.e., over its top surface 3B and along its sides or side edges 3A and 3C. Next, a conductor 4 is formed on a portion of the surface of insulator 3 including one side edge 3A of insulator 3. Second conductor 4 may be comprised of, for example, chrome (Cr). Lastly, pixel electrode 5 is formed on a portion of the surface of glass substrate 1 and a portion of second conductor 4, as shown in both FIGS. 7 and 8. This arrangement of MIM devices, S, and associated pixel electrodes 5 are fabricated over the entire surface of substrate 1 in a matrix configuration. In the example of FIGS. 7 and 8, first conductor 2 is formed to have inter-pixel connection for signal input to each of the pixel electrodes 5.

Thus, lateral MIM device S comprises first and second conductors 2, 4, with insulator 3 formed between these conductors, and together function as a nonlinear passive device for driving pixel electrodes 5. As shown in FIG. 8, in the case of nonlinear MIM device, S, insulator 3 comprises a thicker insulator portion 3B covering the top surface of conductor 2 and a thinner insulator portion 3A covering a side edge of conductor 2. In this manner, insulator portion 3B functions as a barrier layer with high electrical resistance while thinner insulator portion 3A extends over a smaller area of conductor, i.e., its side edge, and will breakdown at higher voltages to permit the flow of current, as is characteristic of a nonlinear device. Only insulator portion 3A on side region 2A of conductor 2 is employed as breakdown region of nonlinear MIM device, S.

As indicated above, by employing thin side insulator 3A along edge 2A of conductor 2 to function as a nonlinear device, the surface area of the nonlinear device can be fabricated to be a very small dimension. As a result, this lateral MIM structure is highly effective for developing high density, high yield LCD panels and other LC devices employing this small lateral MIM device as a nonlinear device for driving the pixel electrodes.

FIG. 9 illustrates the step-by-step process utilized in fabricating lateral MIM device, S. First, as shown in FIG. 9A, a conductive film or layer 2', such as, Ta, is formed on the top surface of transparent substrate 1, which comprises glass. Next, as illustrated in FIG. 9B, conductive film 2' is selectively formed to a predetermined shape by means of photo etching to produce elongated first conductor 2 on substrate 1. Next, as shown in FIG. 9C, an insulating layer or film 3', such as, $TaO_x$, is formed over conductor 2 and on substrate 1.

Next, the selective formation of thick barrier layer 3B is carried out as shown in FIG. 9D. The entire construction of insulator 3 is formed by employing photo etching. Since first conductor 2 is not a transparent film and insulating film 3' is transparent, photosensitive etching can be utilized with exposure thereof through the back surface of substrate 1 wherein conductor 2 functions as a photo resist mask. First, the surface of film 3' is coated with a positive photosensitive resist, i.e., with a photoresist in which photo exposed areas are removed. Exposure of the photosensitive resist takes place from the back surface of transparent substrate 1 and, thereafter, is developed so that the remaining photosensitive resist will be only that formed on the surfaces of conductor 2. After this, barrier layer 3B is formed, as indicated in FIG. 9D, by etching and removing exposed portions of insulating layer 3'. Barrier layer 3B on the top surface of insulator 3 creates a barrier to current flow relative to first conductor 2.

Next, as shown in FIG. 9E, insulator portion 3A are formed by means of anodic oxidation. An example of the process for performing anodic oxidation is described in U.S. application Ser. No. 07/880,120 filed May 7, 1992 in the name of Takashi Nakazawa and entitled "THIN FILM TRANSISTOR AND METHOD OF MANUFACTURE". However, other processes may be utilized to form insulator portions 3A, such as, by CVD, sputtering and thermal oxidation. Insulator portion 3A becomes the operative insulator portion for nonlinear MIM device S which is formed on the side of first conductor 2 The formation of this oxide is followed by the formation of second conductors 4 and pixel electrodes 5, as shown in FIG. 9F, which are selectively made in their predetermined shapes employing photo etching. The lateral overlapping portion of first conductor 2, thin insulator 3A and second conductor 4, formed on the side edge 2A of first conductor 2 together constitute lateral MIM device S.

However, with the formation of a lateral MIM device S, there is also undesirably formed a parasitic or secondary or dummy MIM device S' constituted by first conductor 2, thicker barrier layer 3B, atop conductor 2, and portion 4A of second conductor 4 formed on the top of barrier layer 3B, in spite of the greater thickness of barrier layer 3B. This secondary MIM device S' provides a detrimental influence on the desired characteristics of primary lateral MIM device S. As a result, to eliminate or otherwise significantly reduce this detrimental influence, it is necessary to make the resistance component of the secondary MIM device S' significantly large and the capacitance component of the secondary MIM device significantly small. In order to accomplish this, it is necessary that the thickness of barrier layer 3B be made as thick as possible. However, if barrier layer 3B is made too large in thickness, the fabrication process will become too difficult to handle. For example, the thicker the device height, the longer is the process time to fabricate the device. If the MIM device height is made to be twice that of the conventional MIM height, for example, the time required for fabrication will be twice as long as the conventional device. Therefore, in the case of line fabrication, it is much more efficient and less costly to reduce the fabrication time such as by one half.

Furthermore, there are other problems created in increasing the thickness of the insulator, such as, corresponding increase in the occurrence of defects, e.g., broken connection lines; difficulty in auto photo-alignment; difficulty in focusing; and an increase in the ease of undesirably increasing deviations of pattern sizes during the photo etching process. This latter problem is of particular sensitivity because since the size of the MIM devices in an opto-electrical apparatus determine the contrast ratio, differences in resulting patterns and, therefore, sizes of MIM devices can be fatal so that the resulting yield in the production of such apparatus depends greatly on the uniformity of the size of the MIM devices employed in the apparatus.

In general, in the past, an oxide film having a film thickness of 3,000 Å has been employed for barrier layer 3B. However, for the reasons previously mentioned, it is impractical, if not impossible, to make the barrier film thicker, for example, twice as thick, e.g., 6,000 Å.

It is an object of this invention to decrease the capacitance and increase the resistance in the primary MIM device while substantially eliminating the affect of the secondary MIM device.

It is another object of this invention to improve the operational performance of a lateral MIM device as utilized in opto-electrical apparatus without requiring or utilizing a thicker insulating barrier layer.

It is another object of this invention to enhance the utilization of MIM nonlinear devices through the overall functioning of a dual nonlinear structure effective in the reduction of capacitance.

SUMMARY OF THE INVENTION

According to this invention, an opto-electrical apparatus, such as, a liquid crystal display device, comprises a pixel electrode driving element a first conductor, an insulator and a second conductor formed in stacked sequence on the substrate with the insulator comprising a thicker barrier layer atop the first conductor compared to the side portions thereof. The second conductor is formed in two locations on the insulating side portions of the insulator as well as a portion of the top surface comprising the barrier layer. As a result, a pair of nonlinear devices are formed relative to the same insulator and are connected between a pixel electrode and inter-device interconnect so that an electrically aligned, series connected pair of MIM devices with opposite polarity formation both having nonlinear current/voltage characteristics. Concurrently, a pair of parasitic, secondary MIM devices are also formed in electrically aligned fashion between a pixel electrode and is inter-device interconnect, but the signal path developed through these secondary MIM devices is characterized by including two thick barrier layers and has the same effect of doubling the barrier layer thickness and creating about twice the resistance and reducing by about one half the capacitance. In other words, the pair of parasitic, secondary, nonlinear MIM devices is characterized by an effective barrier layer thickness which is twice that of a single parasitic, secondary, nonlinear MIM device. As a result, deteriorating electrical characteristics due to presence of the secondary nonlinear device, previously described, are prevented so that there is a major improvement in the image quality and the reproducibility and yield of the opto-electrical apparatus.

Thus, the opto-electrical apparatus of this invention is characterized by the creation of a MIM structure comprising the sequential formation of a first conductor, an insulator and a second conductor on a substrate wherein at least one pair of the nonlinear devices are formed relative to the insulator for providing a signal path from the inter-device interconnect through series connected nonlinear MIM devices to drive a pixel electrode. This invention further contemplates more than one pair of such devices, i.e., there can be parallel paths of such devices formed relative to one insulator between the inter-device interconnect and the pixel electrode or there can be two or more insulators relative to each pixel electrode with at least one pair of primary nonlinear MIM devices associated with each insulator. Because the pixel electrode will be driven at least by a series connected pair of first and second nonlinear devices, also a pair of secondary nonlinear devices both of which include the thicker barrier layer will also be formed. Because the signal path passing through these two secondary nonlinear devices are also connected in series, the path requires passage through the barrier layer twice. This has the equivalence of doubling the barrier layer. In the case where multiple but separate insulators are utilized, if the respective insulators are of equal thickness, the resultant affect is the doubling of the barrier film thickness thereby increasing the resistance two-fold and reducing the capacitance by about one half through the secondary signal path of the series connected secondary nonlinear MIM devices. As a result, the primary signal path is through the primary nonlinear MIM devices and the deteriorating affects of the secondary signal path through the secondary nonlinear MIM devices is significantly reduced so that significant improvements in image quality and contrast are achieved.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a plan view of a nonlinear MIM device formed on a substrate illustrating a first embodiment of the opto-electrical apparatus of this invention.

FIG. 2 is a cross sectional view taken along the line 2—2 of FIG. 1.

FIGS. 3A and 3B are, respectively, equivalent circuits of the nonlinear devices comprising this invention and of the prior art.

FIG. 4 is a plan view of a MIM device formed on a substrate illustrating a second embodiment of the opto-electrical apparatus of this invention.

FIG. 5 is a plan view of a MIM device formed on a substrate illustrating a third embodiment of the opto-electrical apparatus of this invention.

FIG. 6 is a graphic illustration of the contrast ratio versus capacitance ratio in connection with the embodiment shown in FIG. 5.

FIG. 7 is a plan view of a MIM device on a substrate as known in the art.

FIG. 8 is a cross sectional view taken along the line 8—8 of FIG. 7.

FIGS. 9A–9F is a sequence of drawings illustrating one example of the step-by-step manufacturing process for a conventional nonlinear MIM device shown in FIGS. 7 and 8.

DESCRIPTION OF THE PREFERRED EMBODIMENTS

Reference is now made to FIGS. 1 and 2 illustrating a MIM device SS formed on a substrate 1 comprising a first embodiment of this invention. Substrate 1 may be comprised of glass and inter-device interconnect 9 comprising first conductor 6 over which is formed insulator 7, is formed on substrate 1. A second conductor 8 is then formed over a portion of insulator 7. As specific examples, conductor 6 made be comprised of Ta, insulator 7 may be comprised of $TaO_x$, and conductor 8 may be comprised of chrome. Alternatively, interconnect 9 may be a single metal layer or conductor.

Interconnect 9 is connected, via second conductor 8, to MIM structure, SS, comprising this invention which consists of first and second lateral, nonlinear MIM devices S1 and S2 electrically connected in series between interconnect 9 and pixel electrode 5. Structure SS comprises a first conductor 2, having a sectional trapezoidal shape, over which is formed insulator 3 having thicker top portion 3B and thinner side portions 3A. Conductor 2 is formed on substrate 1 and may be comprised of tantalum (Ta). A second conductor 4 is then formed over a portion of insulator 3 including a portion of barrier portion 3B. Thus, an extended portion of conductor 8 from interconnect 9 extends to cover a portion of the surface of insulator 3, i.e., is formed over one portion of insulator 3, in particular, a first region of top portion 3B and side portion $3A_1$. An extended portion of another conductor 4 is formed over another portion of insulator 3, in particular, a second region of top portion 3B and side portion $3A_2$. Thus, the overlapping portion of conductor 8 on thin insulating layer $3A_1$ and a portion of barrier layer 3B, constituting the first region, forms a first nonlinear MIM device, S1. Second conductor 4 is connected to pixel electrode 5 and the overlapping portion of conductor 4 on thin insulating layer $3A_2$ and a portion of barrier layer 3B, constituting the second region, forms a second nonlinear MIM device, S2. Second conductor 4 and pixel electrode 5 may be comprised of the same conductive material, such as, ITO or a thin heavy metal film.

Thus, first nonlinear device S1 employs conductors 2 and 8 in combination with insulator side portion $3A_1$ to form a first lateral MIM device. Second nonlinear device S2 employs conductors 2 and 4 in combination with insulator side portion $3A_2$ to form a second lateral MIM device. As previously indicated, first nonlinear device S1 and second nonlinear device S2 are formed such that they are electrically aligned in series between inter-device interconnect 9 and pixel electrode 5. The signal path, therefore, for application of a signal to pixel electrode 5 is from conductor 8 to conductor 2 and thence conductor 4 to pixel electrode 5, i.e., through series connected nonlinear MIM devices S1 and S2.

In the case of the nonlinear structure SS, a secondary nonlinear device S1' is formed by means of barrier layer 3B atop insulator 3 in the vicinity of first nonlinear device S1 and is associated with conductors 2 and 8 in contact with barrier layer 3B. In the same manner, a secondary nonlinear device S2' is formed by means of barrier layer 3B atop insulator 3 in the vicinity of second nonlinear device S2 and is associated conductors 2 and 4 in contact with barrier layer 3B. Each of these secondary nonlinear devices S1', S2' is located electrically in parallel to each of the respective first and primary nonlinear device S1, S2. In addition, they are equivalently connected together in series with one another. Thus, it can be now realized that if dual in-line MIM devices are utilized, the thickness of insulator portions $3A_1$ and $3A_2$ can be reduced to the same or less than the thickness in the case wherein a single MIM device is employed between inter-device interconnect 9 and pixel electrode 5. In effect, then, the improved properties can be achieve with a reduction in the thickness of insulator portions $3A_1$ and $3A_2$ while the thickness of insulator portion 3B remains relatively and equivalently thick so that a corresponding proportional reduction in capacitance is achieved in combination with the effective elimination of secondary MIM structures SS', having significantly larger combined insulator thicknesses, from the circuit. As a specific example, the thickness of insulator portions $3A_1$ and $3A_2$ may be reduced by about 58% compared to a single device insulator portion 3A which may, for example, be approximately 32 nm per insulator portion.

The equivalent circuit arrangement of primary nonlinear MIM structure SS comprising series connected lateral MIM devices S1 and S2 and adjacent disposed secondary nonlinear MIM structure SS' comprising series connected lateral MIM devices S1' and S2' is illustrated in FIG. 3A. In contrast to this, the equivalent circuit for primary nonlinear MIM device S and its secondary nonlinear MIM device of the prior art shown in FIG. 5, is illustrated in FIG. 3B. As is apparent from comparison of the equivalent circuits of FIGS. 3A and 3B, the circuit of this invention in FIG. 3A allows for smaller or reduced capacitance in connection with secondary nonlinear devices S1' and S2' as well as allows for larger or increased resistance compared to the prior art circuit in FIG. 3B. Therefore, in the case of the insulating barrier layer 3 relative to secondary nonlinear devices S1' and S2', it is possible to provide a secondary nonlinear MIM structure SS' with about half the capacitance and about twice the resistance compared to the S' structure of the prior art in FIG. 3B. Moreover, because the capacitance of the secondary nonlinear MIM structure SS' can be reduced and the resistance can be increased via the secondary nonlinear device portions S1' and S2' formed by means of barrier film 3B, it is also possible to reduce the required drive voltage of the opto-electrical apparatus employing these MIM structures SS. In addition, with the affects of the secondary nonlinear devices S1' and S2' dissipated with the introduction of a series connected primary nonlinear devices S1 and S2, improved contrast and a reduction in crosstalk is achieved. Furthermore, by driving the pixel electrodes through a pair of nonlinear MIM devices, S1 and S2, which are arranged in an aligned relation, it is possible to eliminate the difference in polarity between the nonlinear devices. In particular, when the effective surface area of operation of the nonlinear devices S1 and S2 is the same, it is possible to completely eliminate the difference in polarity between back-to-back nonlinear devices S1 and S2.

In the foregoing described embodiment, the pair of nonlinear devices S1 and S2 are arranged in substantially orthogonal or perpendicular relation relative to the rectilinear shape of insulator 3 in FIG. 1. However, this arrangement is optional as other arrangements are possible, such as, illustrated in FIG. 4 wherein nonlinear devices S1 and S2 are formed on diametrical opposite sides 3A of insulator 3.

In the case of FIGS. 1 and 4, a single pair of nonlinear devices S1 and S2 are in an aligned arrangement between inter-device interconnect 9 and pixel electrode 5. However, a plurality of pairs of nonlinear devices S1 and S2, which are paired to each other in an aligned relation, may be formed in parallel between inter-device interconnect 9 and pixel electrode 5. Alternatively, a plurality of such pairs may be formed in adjacent relationship in an aligned arrangement. FIG. 5 shows such an arrangement wherein a plurality of pairs of nonlinear devices S1 and S2, which are paired relative to each other, are formed in parallel between inter-device interconnect 9 and a single pixel electrode 5. In FIG. 5, two separate independent pairs of nonlinear MIM structures SS1 and SS2 are paired in an aligned relation and connected in parallel between inter-device interconnect 9 and pixel electrode 5. Such an arrangement provides for redundancy so that defective devices can be removed from the pixel driving circuit without a substantial change occurring to display contrast. The result is a significant increase in manufacturing yield in opto-electrical apparatus utilizing this parallel lateral MIM device scheme of FIG. 5. It should be noted that more than two pairs of nonlinear MIM structures may be utilized taking into consideration costs incurred in providing additional device pairs, SSn.

FIG. 6 illustrates how liquid crystal display contrast will change in terms of pixel capacitance ($C_P$) and nonlinear MIM device capacitance ($C_D$), i.e., the capacitance ratio, $C_P/C_D$, for operating conditions at room temperature, illustrated by the solid line curve 12, and high temperature (60° C.), illustrated by the dotted line curve 10. In the case where both pairs of MIM structures SS1 and SS2 are in operation, the capacitance ratio is at four, as indicated at vertical dotted line 14. If one of these structures SS1 or SS2 is defective, it may be removed from the circuit employing laser trimming thereby leaving the remaining MIM structure SS pair for driving pixel electrode 5. As a result, the capacitance ratio will approximately double in value, i.e., it increases to a capacitance ratio of eight, as indicated as vertical dotted line 16. However, as illustrated in FIG. 6, the contrast level in the case of one removed structure SS pair at ratio 8 is about the same contrast level as in the case of both MIM structure SS pairs present at ratio 4. As a result, the contrast ratio is not substantially affected in the case wherein one of the MIM structures SS of the two-pair, nonlinear MIM structures SS1 and SS2 employed for driving a pixel electrode 5 has been removed from the circuit, as compared with other two-pair, nonlinear MIM structures SS1 and SS2 driving other pixel electrodes 5. This is specifically indicated in FIG. 6 by the two dotted lines 20 indicating the change in contrast ratio between capacitance ratios 4 and 8. To be noted is that at normal operating temperature of an opto-electrical apparatus, the contrast ratio would fall within the regions between the opposite ends of lines 20 along vertical lines 14 and 16 so that under normal operating temperature conditions, the resultant contrast across the display would be highly uniform in the case for both single-pair and dual-pair nonlinear MIM structures, such as illustrated by dotted line 22.

In the prior art, when nonlinear devices, such as, a MIM device, have been applied to pixel drive devices to provide gray scale or gradation, even if two devices are provided for one pixel, if one is separated, the capacitance ratio of the pixel and device significantly changed resulting in a large difference in contrast with no way for repair of such a defect. In the case of a simple two-value display wherein the display pixels are fully on or off, it is possible to correct for contrast differences to a certain degree by optimizing the driving method applied to the display pixels. However, because gradation was not possible, such a nonlinear device could not be employed for the display of television images which require greater levels of contrast. In contrast to this, however, if an optimized capacitance ratio is selected, as described above, it would be possible to obtain a sufficiently equivalent contrast, i.e., uniform contrast, even if the gradation was required over a wide temperature range for combinations of aligned one-pair nonlinear MIM devices or two-pair nonlinear MIM devices. Thus with the application of this pixel defect redundancy structure, the yield in the manufacture of opto-electrical apparatus employing the dual structures SS1 and SS2 of FIG. 5 is significantly increased.

While the invention has been described in conjunction with several specific embodiments, it is evident to those skilled in the art that many further alternatives, modifications and variations will be apparent in light of the foregoing description. For example, this invention is not limited to liquid display devices but also has application to other opto-electrical display devices, particularly of the variety that have pixel driven elements and are adaptable for the use of nonlinear devices. Thus, the invention described herein is intended to embrace all such alternatives, modifications, applications and variations as may fall within the spirit and scope of the appended claims.

What is claimed is:

1. An opto-electrical apparatus including a plurality of pixel electrodes, a plurality of interconnects formed in spaced relation to said electrodes, and at least one primary nonlinear MIM structure including a pair of primary nonlinear MIM devices formed in series between a corresponding interconnect and a pixel electrode, each of said primary nonlinear MIM devices including insulators within a signal path through said primary nonlinear MIM structure, said primary nonlinear MIM structure also including parasitic, secondary nonlinear MIM structure including a pair of secondary nonlinear MIM devices each of which is electrically connected in parallel to one of said pair of primary nonlinear MIM devices, each of said secondary nonlinear MIM devices further including a barrier layer within a signal path through said secondary nonlinear MIM structure, said barrier layer being integral with and thicker than said insulators concurrently increasing a resistance of said secondary nonlinear MIM structure while reducing a capacitance of said secondary nonlinear MIM structure such that the opto-electrical apparatus primarily operates through said signal path through said primary nonlinear MIM structure.

2. The opto-electrical apparatus of claim 1 wherein said primary nonlinear MIM devices comprise a first conductor having a top surface and side surfaces formed on a substrate, said insulator being formed on said first conductor, said insulator having portions covering said top and said side surfaces wherein a thickness of said portion coverings said top surface is greater than a thickness of said portions covering said side surfaces with said portion covering said top surface defining said barrier layer, and second and third conductors formed on said insulator, said second conductor extending over one of said side surfaces and a first region of said top surface and connecting to said interconnect, said third conductor extending over another of said side surfaces and a second region of said top surface and connecting to said pixel electrode.

3. The opto-electrical apparatus of claim 1 wherein at least two of said primary nonlinear MIM structures are formed in parallel between said inter-pixel interconnect and said pixel electrode.

4. An opto-electrical apparatus including a plurality of pixel electrodes, a plurality of interconnects formed in spaced relation to said electrodes, and at least one primary nonlinear MIM structure including a pair of primary nonlinear MIM devices formed in series between a corresponding interconnect and a pixel electrode, said primary nonlinear MIM Structure also including a parasitic, secondary nonlinear MIM structure including a pair of secondary nonlinear MIM devices each of which is electrically connected in parallel to one of said pair of primary nonlinear MIM devices, both of said nonlinear MIM structures including an insulator with insular portions within a signal path through said primary nonlinear MIM structure and barrier portions within a signal path through said secondary nonlinear MIM structure, wherein an effective barrier portion thickness of said secondary nonlinear MIM structure is greater than a thickness of each of said insular portions, and said thickness of each of said barrier portions is greater than a thickness of each of said insulating portions concurrently increasing a resistance of said secondary nonlinear MIM structure while reducing a capacitance of said secondary nonlinear MIM structure such that the opto-electrical apparatus primarily operates through said signal path through said primary nonlinear MIM structure.

5. An opto-electrical apparatus including a plurality of display pixels each being characterized by a pixel capacitance ($C_P$) and each having pixel electrodes, a plurality of interconnects formed in spaced relation to said electrodes, and at least two primary nonlinear MIM structures characterized by a device capacitance ($C_D$) and formed in parallel between a corresponding interconnect and a pixel electrode, each of said primary nonlinear MIM structures comprising a pair of primary nonlinear MIM devices connected in series between said corresponding interconnect and said pixel electrode, said pair of primary nonlinear MIM devices including insulator portions within a signal path of said primary nonlinear MIM structure which includes said pair of primary nonlinear MIM devices, each of said primary nonlinear MIM structures further including a secondary nonlinear MIM structure formed from a pair of secondary nonlinear MIM devices each of which is electrically connected in parallel to one of said pair of primary nonlinear MIM devices, said pair of secondary nonlinear MIM devices including barrier portions within a signal path of said secondary nonlinear MIM structure which includes said pair of secondary nonlinear MIM devices, said barrier portions being thicker than said insulator portions concurrently increasing a resistance of said secondary nonlinear MIM structure while reducing a capacitance of said secondary nonlinear MIM structure such that the opto-electrical apparatus primarily operates through said signal path through said primary nonlinear MIM structure, said capacitances being optimally selected such that the opto-electrical apparatus operates with a uniform contrast even though a capacitance ratio ($C_P/C_D$) approximately doubles when one of said primary nonlinear MIM structures is removed.

* * * * *